3,066,109
Patented Nov. 27, 1962

3,066,109
AQUEOUS EMULSION OF ALKYL ACRYLATE POLYMER AND VINYL POLYMER AND CELLULOSIC FIBER IMPREGNATED WITH SAME
John F. Hechtman and Paul A. Simonen, Munising, Mich., assignors to Kimberly-Clark Corporation, Neenah, Wis., a corporation of Delaware
No Drawing. Filed Jan. 24, 1958, Ser. No. 710,865
6 Claims. (Cl. 260—29.6)

This invention relates to saturated fibrous products and a composition of matter especially suitable as the saturant theerof. It is concerned more particularly with fibrous webs impregnated with a composition containing a blend of a vinyl-type polymeric resin and a copolymer formed from an initially unsaturated carboxylic acid and an alkyl acrylate. The impregnated product of this invention has special advantages for use as a base or carrier sheet in the manufacture of decorative vinyl-surfaced felt base floor coverings, wall coverings, and the like.

In the manufacture of felt base floor coverings, wall coverings, and similar materials, an impregnated fibrous web is used as the carrier sheet to which is applied a ground coat or decorative background, a printed design, and a wearing surface. Normally, this composite sheet is then laminated to a thicker asphalt saturated felt base, usually with an asphalt adhesive. Prior art discloses the use of various plasticized resins to impregnate the paper web used for this carrier sheet. In recent times, vinyl resins have been chosen for the wearing surface because of their high abrasion resistance and long wear life. Resins of the vinyl type also have been found particularly suitable as the carrier sheet impregnant because they aid in obtaining a strong adherence between the wearing surface and the fibrous base.

It is well known in the art that vinyl resins as a class are hard, horny, relatively intractable materials and that when used in the manufacture of flexible articles of commerce, these resins must ordinarily be plasticized to obtain the desired flexibility at normal use temperatures. Suitable plasticizers vary with the specific end use; however, the esters of polybasic acids such as phthalates, sebacates, and adipates are generally recognized as useful primary plasticizers, with aromatic phosphates being used extensively in vinyl products intended for use in the electrical industry. Plasticizers from the above group specifically recommended for plasticizing polyvinyl chloride and the copolymers of vinyl chloride and vinyl acetate are dioctyl phthalate, dibutoxyethyl phthalate, triglycol, di-2-ethylhexoate, dibutyl phthalate, and tricresyl phosphate. Other useful plasticizers for the above types of vinyl resins are aromatic ethers, ketones, esters, chlorinated esters and similar sulphur-containing compounds. For use with polyvinyl acetate, plasticizing esters, such as ethylhexoates, phthalates, glycolates, and the phosphates have been especially recommended.

In fibrouse base sheets of the type related to the product of this invention, the use of any of the above plasticizers has resulted in certain disadvantages in the end product including the lack of solvent resistance, a high volatility, and a tendency to migrate. To overcome these disadvantages, vinyl resin-nitrile rubber blends have been developed in which the latter component, a polymeric butadiene-acrylonitrile, is claimed to function as a non-volatile, non-migratory plasticizer for the vinyl. Such a composition is described in United States Patent 2,330,353 dated September 28, 1943. The specific use of a polyvinyl resin polymeric butadiene-acrylonitrile blend for the impregnation of fibrous base sheets in the manufacture of floor coverings, is described in United States Patent 2,683,094 dated July 6, 1954, and is an improvement over webs saturated with vinyls plasticized by one or more of the plasticizers previously listed.

As pointed out in the latter patent, the presence of the vinyl type resin in the saturant aids in obtaining strong adherence between the finish coatings of vinyl and the base sheet, so that any tendency for the coating layers to peel off or otherwise delaminate is virtually eliminated. The butadiene-acrylonitrile polymer in the blend, besides plasticizing the vinyl, has the added advantages of being non-migratory and non-volatile. However, since the butadiene-acrylonitrile is an unsaturated polymer, its presence lowers the resistance of the composition to oxidation, and makes it vulnerable to degradation and discoloration upon extended exposure to air. Further, although the above composition provides excellent adhesion to a plasticized vinyl top coating, its general resistance to asphalt bleed-through from the asphalt adhered base felt is marginal.

The product of the subject invention overcomes these disadvantages and is a further improvement in the art in this field as will be pointed out hereinafter.

It is a primary object of this invention to provide an improvel fibrous base or carrier sheet for subsequent fabrication into floor covering material and related products.

It is also an object of this invention to provide a new composition of matter suitable for use in impregnating a fibrous web to be subsequently utilized in fabricating an improved floor covering material.

A more specific object of this invention is to provide an improved saturating composition for the uses herein described, which comprises a blend of a polyvinyl resin, and a copolymer formed from an initially unsaturated carboxylic acid and an alkyl acrylate; this composition being particularly advantageous for use as the saturant for a fibrous web capable of being subsequently fabricated into an improved floor covering material; the latter floor covering being characterized by excellent initial color, improved color stability upon subjection to heat and light aging, improved resistance to degradation from oxidation, high resistance to asphalt bleed-through, high resistance to printing ink solvents, and improved resistance to splitting and delamination.

The above and other objects will be made more apparent in the following description of certain preferred embodiments of the invention.

Our invention is based on the discovery that a copolymer formed from an initially unsaturated carboxylic acid and an alkyl acrylate when physically blended with a polyvinyl resin functions as an external plasticizer for the vinyl, an effect not normally attributable to this copolymer. Further, when a saturant consisting of this blend is used to impregnate a fibrous cellulosic web, it has the added advantage of exhibiting a specific adhesion to the cellulose. We believe that the saturant probably attaches itself to the cellulose by means of a cross-linking of the carboxylic acid groups present in the saturant with the hydroxyl groups present in the cellulose.

The fibrous sheet which is to be saturated may be one of the bibulous type sheets often used in the industry as a saturating base. Such a sheet may have a basis weight of from 25 to 80 pounds per 25" x 38"—500 sheet ream. The base sheet we have used for commercial production has a 39 pound basis weight and consists of 100 percent bleached kraft fibers.

Vinyl resins which may be used in the saturating composition include polyvinyl chloride, polyvinyl acetate, copolymers of vinyl chloride and vinyl acetate, copolymers of vinyl chloride and vinylidene chloride, and modified vinyl chloride copolymers in which the vinyl chloride predominates and has been copolymerized with lesser, but modifying, ratios of compatible monomers. Preferred resins include polyvinyl chloride, and a copolymer comprising a major portion of vinyl chloride and a minor portion of an alkyl acrylate.

The material which is blended homogeneously with the polyvinyl resin to act as an external plasticizer for the latter in accordance with our invention is a composition containing a copolymer formed of at least one polymerizable-unsaturated carboxylic acid in which the unsaturation is a double bond, or ethylenic linkage, and at least one alkyl acrylate in which the alkyl group has from one to four carbon atoms. Examples of polymerizable mono-unsaturated-ethylenic carboxylic acids include: acrylic acid, methacrylic acid, itaconic acid, aconitic acid, maleic acid, fumaric acid, and the like. Examples of alkyl acrylates includes the esters of primary alkanols, such as methyl acrylate, ethyl acrylate, propyl acrylate, and butyl acrylate; and esters of secondary alkanols, such as isopropyl acrylate and iso-butyl acrylate. These copolymers are of a softness such that hardening comonomers may be introduced. Examples of such hardening comonomers include the alkyl methacrylates in which the alkyl group may have from one to four carbon atoms, for example; the methyl, ethyl, propyl, iso-propyl, butyl, and iso-butyl methacrylates.

Proportions of the monomers used to produce the copolymer, for example may be from about 0.5 percent to about 7 percent by weight of a carboxylic acid compound, at least 80 percent by weight of an alkyl acrylate, and from 0 percent to 19.5 percent of an alkyl methacrylate.

The following are several typical copolymer systems, in which the percentages given are by weight:

| | Percent |
|---|---|
| Ethyl acrylate | 84.5 |
| Methyl methacrylate | 10.5 |
| Itaconic acid | 5.0 |
| Ethyl acrylate | 85.0 |
| Methyl methacrylate | 10.0 |
| Acrylic acid | 5.0 |
| Ethyl acrylate | 95.0 |
| Acrylic acid | 5.0 |
| Ethyl acrylate | 95.0 |
| Methacrylic acid | 5.0 |

Techniques for polymerizing the foregoing monomers into the copolymers are illustrated in United States Patents 2,760,886 dated August 28, 1956; 2,790,735 dated April 30, 1957; 2,790,736 dated April 30, 1957; and 2,795,564 dated June 11, 1957.

The copolymer dispersions may be made by any of the well known emulsion copolymerization procedures, e.g., by first mixing the several monomers in the desired proportions into an aqueous solution of an anionic or preferably a non-ionic dispersing or emulsifying agent.

Saturation of the base sheet may be accomplished by various of the saturating procedures now utilized in the industry. For example, a web of unsaturated base paper may be fed from a supply roll into a saturating section. The saturating section may consist of squeeze rolls so located that the nip has a downward angle into which the paper is fed forming a trough between the paper and top squeeze roll so that the saturant can be supplied in this trough. Alternatively, the saturating section may be a float tank prior to squeeze rolls in which the paper is floated on the surface of the saturant and becomes impregnated by capillary forces carrying the saturant into the sheet. Excess saturant is removed by the squeeze rolls as in the previous operation and the saturant vehicle may be evaporated by passing the sheet over heated can driers or through a hot air tunnel. Another way of saturating the paper is through the use of a conventional size press, or a coating press, on the paper machine itself, the treating press being located between two drier sections.

In general, the ingredients of the saturant may be made up into compositions with the following ranges:

| | Parts by Weight |
|---|---|
| Polymeric vinyl resin | 40–70 |
| Carboxylic acid-alkyl acrylate copolymer | 60–30 |
| Pigment | 0–30 |

In preparing the aqueous dispersion, the total solids content of the above composition may range from 10 to 60 percent, the balance being water.

The ratio of dry saturant polymer to fiber for a given base sheet is controlled primarily by the dry solids content of the saturant. A secondary but minor control is effected by the nip pressure of the squeeze rolls. Saturant solids of about 10 to about 60 percent may be employed depending upon the polymer to fiber ratio desired in the saturated product, although the preferred range is from about 15 to 50 percent. The majority of products for use in floor coverings are made within the range from about 50 to 65 parts of dry saturant per hundred parts by weight of fiber, although it is possible to produce useful products in the range of 10 to 100 parts dry saturant per hundred parts by weight of fiber. In general, retention of solids on the fibers or pick-up in the range of 50 to 60 parts appear to be optimum, both from the standpoint of economics and physical property performance. It is understood, of course, that the amount of pick-up may be set at the level required for the sheet to perform satisfactorily in its particular end use. For example when higher delamination-, abrasion-, and scuff-resistance are required, for instance where the sheet is to be used as a surfacing sheet for plywood, the pick-up level may be raised in like proportion and be set at from 50 to 100 parts per hundred parts by weight of fibers. In other potential uses, such as for base sheets for pressure sensitive labels or garnet abrasive papers the pick-up may be lowered to around 10 to 25 parts of dry saturant per 100 parts of fiber. The heat treatment step in which the sheet is dried following its impregnation, causes important changes in saturated sheet properties and it is probably here that the chemical attachment of the carboxyl groups to the cellulose takes place.

Other well known additives may be included in compounding the saturating composition to enhance certain specific properties.

For example, salts of heavy metals such as zinc oxide may be used to improve further solvent resistance, heat and light stability and dry tensile strength. Conventional rubber antioxidants may be used where extreme resistance to heat and light stability is required. Clays may be used as loading or extending agents. Titanium dioxide has been found desirable as a pigment for increasing opacity and improving whiteness. Other conventional colored pigments also may be used.

The saturated base sheet of this invention is converted further by giving it a ground coat about 0.5 mil thick of a vinyl chloride organosol resin containing titanium dioxide pigment. The ground-coated sheet is then rotogravure printed with inks having aromatic and ketone solvents. Usually the application of the ground coat and the subsequent printing are an in-line operation. As a result, the plasticizer and residual solvent from the organosol along with solvent from the inks may have a tendency to dissolve and tackify the base sheet saturant to the point where undesirable sticking and transfer of fiber and resin to rolls in the printing press occurs, unless previously mentioned solvent resistant plasticizers are used in the saturant. After printing, the sheet is coated in a separate operation with a film of about 4 mils thick of plasticized vinyl chloride resin. This requires the sheet to be subjected to temperatures of 175° to 205° C. for a period of 2 to 4 minutes. In better quality floor coverings the top coat film may be as much as 15 mils thick, in which case the coating operation must be repeated three times It is this severe heat treatment which causes the breakdown of an improperly formulated or inadequate base sheet saturant, a condition which the composition of this invention overcomes. The final operation involves laminating the coated sheet to a base felt with an asphalt adhesive. The possibility of bleed-through of the dark-colored components from the asphalt in the adhesive and the base felt is another problem which our invention solves.

The following examples will more clearly illustrate specific embodiments of the invention. They are given by way of illustration only and are not intended as a limitation of the scope of the patent.

*Example I*

A bibulous paper web composed of 100 percent bleached kraft fibers and having a basis weight of 39 pounds (25" x 38"—500 sheet ream) was passed through a saturating press supplied with an aqueous dispersion of saturant consisting of 54 percent water and 46 percent by weight of a blend of 60 parts polyvinyl chloride; 40 parts of a copolymer consisting of 85 percent ethyl acrylate, 10 percent methyl methacrylate and 5 percent acrylic acid; and 20 parts titanium dioxide as a pigment. The saturating press rolls were arranged at such an angle so that a trough was formed at the nip. The saturant was supplied to both sides of the sheet by showers directed into the nip. Excess saturant was removed by squeeze rolls. The web picked up approximately 57 parts by weight of saturant on a dry solids basis per 100 parts by weight of fiber. The saturated fiber web was then passed over a series of can driers heated to approximately 120° C. and was dried to approximately 3 percent moisture content. The dried sheet was then compacted and smoothed by being passed through a calender stack, after which it was wound on a reel for shipment to the using plant. The final impregnated web had a basis weight of approximately 62 pounds.

*Example II*

The conditions of Example I were repeated except that for the 60 parts of polyvinyl chloride there was substituted 60 parts of a copolymer consisting of 80 parts by weight of vinyl chloride and 20 parts by weight of methyl acrylate.

*Example III*

The conditions of Example I were repeated except that for the 60 parts of polyvinyl chloride there was substituted 60 parts of a modified vinyl chloride copolymer known commercially as Geon 352. This resin is a slightly modified copolymer in which the vinyl chloride predominates and has been copolymerized with lesser, but modifying, ratios of one or more than one of a variety of monomers copolymerizable therewith including vinyl and vinylidene esters of organic and inorganic acids, olefinic hydrocarbons such as styrene and isobutylene, and esters of olefinic acids such as acrylic and methacrylic.

When the saturating composition, which forms a part of this invention, was used in commercial production it was found that in addition to the improvement it gave to the characteristics of the finished sheet, the composition itself had a further advantage in that it displayed much better mechanical stability in the saturating press than materials used previously, and did not break down under the extensive mechanical working it received. This permitted longer runs, better control and less operating down time than was possible hitherto.

It will be understood that other methods and means of applying the principle of the invention herein described may be used without departing from the spirit and scope of the invention as specifically pointed out and described in the above specification and the appended claims.

We claim:

1. A cellulosic fiber web impregnated throughout with from 10 to 100 parts by weight per 100 parts by weight of fiber of a composition consisting of an homogeneous mixture of a polymerized vinyl resin physically blended with and externally plasticized by an emulsion polymerized copolymer selected from the group consisting of a copolymer formed from about 0.5 to 7 percent by weight of a polymerizable monounsaturated-ethylenic carboxylic acid and the remainder of an alkyl acrylate in which the alkyl group has from 1 to 4 carbon atoms and a copolymer formed from about 0.5 to 7% by weight of polymerizable mono-unsaturated-ethylenic carboxylic acid, an alkyl acrylate in which the alkyl group has from 1 to 4 carbon atoms, and an alkyl methacrylate in which the alkyl group has from 1 to 4 carbon atoms, said resin being selected from the group consisting of polyvinyl chloride, polyvinyl acetate, copolymers of vinyl chloride and vinyl acetate, copolymers of vinyl chloride and vinylidene chloride, and copolymers of vinyl chloride and an alkyl acrylate in which the alkyl group has from 1 to 4 carbon atoms.

2. A cellulosic fiber web impregnated throughout with from 50–65 parts by weight per 100 parts by weight of fiber of a composition consisting of an homogeneous mixture of from 40 to 70 parts by weight of a polymerized vinyl resin physically blended with and externally plasticized by from 60 to 30 parts by weight of an emulsion polymerized copolymer selected from the group consisting of a copolymer formed from about 0.5 to 7 percent by weight of a polymerizable mono-unsaturated-ethylenic carboxylic acid and the remainder of an alkyl acrylate in which the alkyl group has from 1 to 4 carbon atoms and a copolymer formed from about 0.5 to 7% by weight of polymerizable mono-unsaturated-ethylenic carboxylic acid, an alkyl acrylate in which the alkyl group has from 1 to 4 carbon atoms, and an alkyl methacrylate in which the alkyl group has from 1 to 4 carbon atoms, said resin being selected from the group consisting of polyvinyl chloride, polyvinyl acetate, copolymers of vinyl chloride and vinyl acetate, copolymers of vinyl chloride and vinylidene chloride, and copolymers of vinyl chloride and an alkyl acrylate in which the alkyl group has from 1 to 4 carbon atoms.

3. A cellulosic fiber web impregnated throughout with from 50–65 parts by weight per 100 parts by weight of fiber of a composition consisting of an homogeneous mixture of a polymerized vinyl resin physically blended with and externally plasticized by an emulsion polymerized copolymer selected from the group consisting of a copolymer formed from about 0.5 to 7 percent by weight of a polymerizable mono-unsaturated-ethylenic carboxylic acid and the remainder of an alkyl acrylate in which the alkyl group has from 1 to 4 carbon atoms and a copolymer formed from about 0.5 to 7% by weight of polymerizable mono-unsaturated-ethylenic carboxylic acid, an alkyl acrylate in which the alkyl group has from 1 to 4 carbon atoms, and an alkyl methacrylate in which the alkyl group has from 1 to 4 carbon atoms, said resin consisting of a copolymer comprising about 80 parts by weight of vinyl chloride and about 20 parts by weight of an alkyl acrylate in which the alkyl group has from 1 to 4 carbon atoms.

4. A cellulosic fiber web impregnated throughout with from 50–65 parts by weight per 100 parts by weight of fiber of a composition consisting of an homogeneous mixture of a polymerized vinyl resin physically blended with and externally plasticized by an emulsion polymerized copolymer formed from about 0.5 to 7 percent by weight of a polymerizable mono-unsaturated-ethylenic carboxylic acid, at least 80% of an alkyl acrylate in which the alkyl group has from 1 to 4 carbon atoms, and up to 19.5 percent of an alkyl methacrylate in which the alkyl group has from 1 to 4 carbon atoms, said resin being selected from the group consisting of polyvinyl chloride, polyvinyl acetate, copolymers of vinyl chloride and vinyl acetate, copolymers of vinyl chloride, vinylidene chloride, and copolymers of vinyl chloride and an alkyl acrylate in which the alkyl group has from 1 to 4 carbon atoms.

5. A composition of matter for impregnating a fibrous web to obtain a product suitable for use as a carrier sheet in the manufacture of floor coverings, said composition comprising an aqueous dispersion containing about 10 to 60 percent solids by weight, said solids consisting of an homogeneous mixture of about 40 to 70 parts by weight of a polymerized vinyl resin physically blended with and externally plasticized by about 60 to 30 parts by weight of an emulsion polymerized copolymer selected from the group consisting of a copolymer formed from about 0.5 to 7 percent by weight of a polymerizable mono-unsaturated-ethylenic carboxylic acid selected from the group consisting of acrylic, methacrylic, itaconic, aconitic, maleic, and fumaric acid, and the remainder of an alkyl acrylate selected from the group consisting of methyl, ethyl, propyl, butyl, iso-propyl, and iso-butyl acrylates and a copolymer formed from about 0.5 to 7% of weight of a polymerizable mono-unsaturated-ethylenic carboxylic acid selected from the group consisting of acrylic, methacrylic, itaconic, aconitic, maleic, and fumaric acid, an alkyl acrylate selected from the group consisting of methyl, ethyl, propyl, butyl, iso-propyl and iso-butyl acrylates, and an alkyl methacrylate selected from the group consisting of methyl, ethyl, propyl, butyl, iso-propyl, and iso-butyl methacrylates, said resin being selected from the group consisting of polyvinyl chloride, polyvinyl acetate, copolymers of vinyl chloride and vinyl acetate, copolymers of vinyl chloride and vinylidene chloride, and copolymers of vinyl chloride and an alkyl acrylate having 1 to 4 carbon atoms.

6. An impregnating composition for fibrous webs comprising an aqueous dispersion containing about 15 to 50 percent polymeric solids by weight, said polymeric solids consisting of an homogeneous mixture of about 60 parts by weight of a vinyl chloride copolymer composed of about 80 parts by weight of vinyl chloride and about 20 parts by weight of an alkyl acrylate in which the alkyl group has from 1 to 4 carbon atoms, and about 40 parts by weight of an emulsion polymerized copolymer consisting of about 85 percent ethyl acrylate, about 10 percent methyl methacrylate, and about 5 percent acrylic acid, said vinyl chloride copolymer being physically blended with and externally plasticized by said emulsion polymerized copolymer.

References Cited in the file of this patent

UNITED STATES PATENTS

| | | |
|---|---|---|
| 2,327,846 | Kistler | Aug. 24, 1943 |
| 2,391,621 | Powell | Dec. 25, 1945 |
| 2,461,613 | Quarles | Feb. 15, 1949 |
| 2,520,919 | Forgie | Sept. 5, 1950 |
| 2,557,025 | Brand | June 12, 1951 |
| 2,719,137 | Tawney | Sept. 27, 1955 |
| 2,757,106 | Brown et al. | July 31, 1956 |
| 2,760,886 | Prentiss et al. | Aug. 28, 1956 |
| 2,790,735 | McLaughlin et al. | Apr. 30, 1957 |
| 2,899,351 | Morse | Aug. 11, 1959 |